United States Patent [19]

Schlueter

[11] Patent Number: 4,515,091
[45] Date of Patent: May 7, 1985

[54] METHOD OF REMOVING PLASTIC RESIDUES IN MIXING APPARATUSES AND MOLDING TOOLS

[76] Inventor: Klaus Schlueter, 1 c Windeckstrasse, 8000 Muenchen 70, Fed. Rep. of Germany

[21] Appl. No.: 525,622

[22] Filed: Aug. 23, 1983

[30] Foreign Application Priority Data

Aug. 26, 1982 [DE] Fed. Rep. of Germany ....... 3231795

[51] Int. Cl.³ .............................................. F23G 3/00
[52] U.S. Cl. .................................... 110/346; 110/236
[58] Field of Search ....................... 110/346, 236, 235; 425/225; 134/1, 4

[56] References Cited

U.S. PATENT DOCUMENTS

| 3,263,928 | 8/1966 | Gusmer .............................. 239/123 |
| 4,032,361 | 6/1977 | Eriksson et al. ................ 110/236 X |
| 4,141,373 | 2/1979 | Kartanson et al. ............. 110/236 X |

FOREIGN PATENT DOCUMENTS 2046888  11/1980  United Kingdom ................ 110/236

Primary Examiner—Edward G. Favors
Attorney, Agent, or Firm—Keil & Weinkauf

[57] ABSTRACT

Plastic residues in mixing apparatuses and molding tools filled from these are removed by a method in which the said residues are vaporized by heating.

1 Claim, 3 Drawing Figures

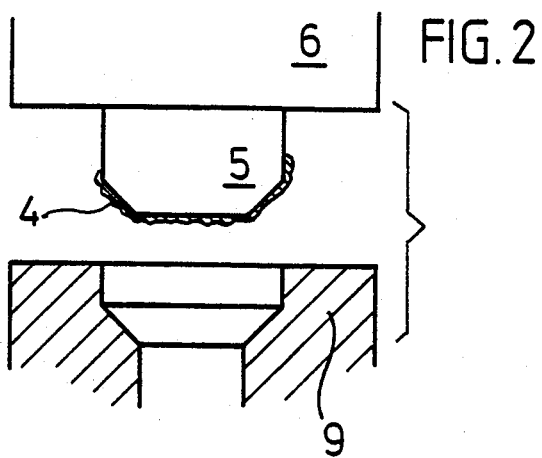
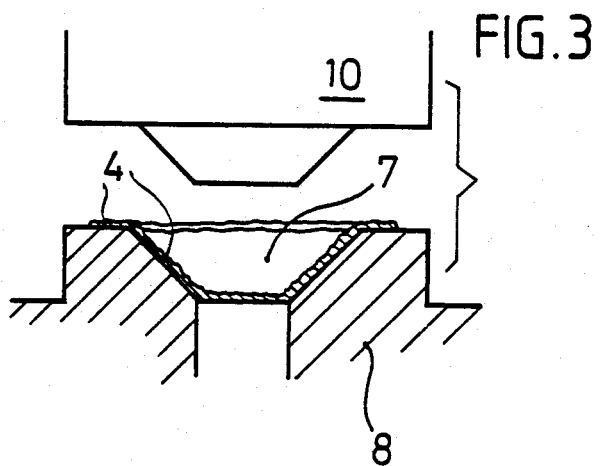

METHOD OF REMOVING PLASTIC RESIDUES IN MIXING APPARATUSES AND MOLDING TOOLS

The present invention relates to a method of removing plastic residues in mixing apparatuses and molding tools filled from these.

Apparatuses for mixing plastic components, which are referred to as mixing heads by those skilled in the art, possess a piston valve which, when in the retracted position, leaves the inlet nozzles for the components and the mixing space free for the mixing process. To introduce the mixing of components into a molding tool, the latter, in the case of closed molds, is usually equipped with a feed cone, and the mixing head is equipped with a discharge tube which fits this feed cone. After the molding tool has been filled, the piston valve returns to the closed position, so that the mixing process is terminated and plastic residues are ejected.

Frequently, plastic residues remain adhering to the base of the piston valve, the discharge tube of the mixing head and the feed cone of the molding tool; these residues harden and are then troublesome in the subsequent mixing and filling cycles. For example, residues projecting into the mixing space can deflect the component jets emerging from the inlet nozzles and hence cause inadequate mixing. Residues at the discharge tube or feed cone can result in the seal between these components not being tight, so that the shot weight, ie. the amount of plastic introduced into the molding tool, does not correspond to the predetermined weight. Furthermore, air bubbles can be drawn in at the uptight point, resulting in defects (bubbles) in the molding. Under certain circumstances, there may also be a risk from plastic material emerging under pressure.

In the art, there has therefore been no lack of attempts to take appropriate countermeasures, for example using scrapers or rotating brushes; however, these become coated relatively rapidly with the products scraped off, and their cleaning action then deteriorates. Attempts have also been made to remove the plastic residues from the components by means of a jet of air or using solvents. However, these methods led to substantial pollution of the environment and constituted an additional hazard. The use of a solvent bath in which the mixing head is immersed has also been disclosed; to clean the solvent, it has to be pumped continuously through a filter. Apart from the expense entailed with regard to apparatus, this method is involved and too slow, so that it is not suitable for the rapid sequence of cycles associated with series operations.

It is an object of the present invention to remove plastic residues from mixing apparatuses and molding tools filled from these, by an effective procedure which keeps pace with a rapid cycle of operations and does not entail any risk or pollute the environment.

I have found that this object is achieved by a method as defined in the claims.

Details and advantages of the novel method are described below with reference to examples illustrated in the drawing.

FIG. 2 shows the discharge tube of the mixing head, facing a heatable shaped part;

FIG. 3 shows the feed cone of a molding tool, facing a heatable shaped part.

Figure 1:
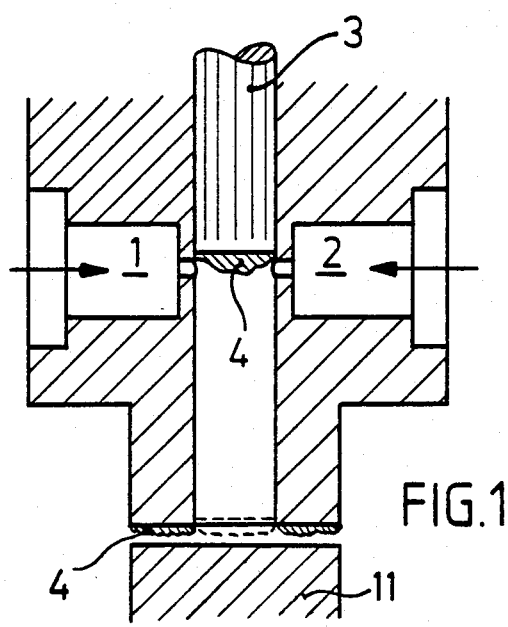
FIG. 1 shows a longitudinal section of a mixing head, with plastic residues at the base of the piston valve.

In the mixing head shown diagrammatically in longitudinal section in FIG. 1, inlet nozzles 1 and 2 are recognizable, with piston valve 3 in between them. Plastic residues 4 adhere to the base of the piston valve and prevent a direct meeting of the component jets. These residues are not formed if they are vaporized by heating, in accordance with the invention; this is done with the piston valve in the forward position (closed mixing head) and residues at the end of the discharge tube are also vaporized. For this purpose, the plastic residues 4 on the discharge tube and piston base (broken line in FIG. 1) or on discharge tube 5 of mixing head 6 (FIG. 2) or on feed cone 7 of a molding tool 8 (FIG. 3) are brought into contact with a shaped part 9, 10 or 11 which is adapted to the shape of these components 5 and 7 and is heated to about 500° C. The resulting product vapors are extracted directly so that they cannot enter the environment.

The components coated with plastic residues can also be heated themselves, for example by means of resistance heaters or inductive heaters or by high-frequency transmission of heat energy. Another possible method comprises flushing the components with a heating medium. For this purpose, it is advantageous if these components have double walls, between which the medium can flow. Shaped parts 9 and 10 can of course be heated in the same manner.

Practical tests have shown that the parts in question are freed completely from the plastic residues within a few seconds, without any damage resulting.

I claim:

1. A method for removing plastic residues in a mixing apparatus or molding tool filled from such apparatus, wherein the plastic residues are heated and vaporized by means of a heated shaped part adapted to the shape of the component to which the said residues adhere.

* * * * *

UNITED STATES PATENT AND TRADEMARK OFFICE
CERTIFICATE OF CORRECTION

PATENT NO. : 4,515,091

DATED : May 7, 1985

INVENTOR(S) : Klaus SCHLUETER

It is certified that error appears in the above–identified patent and that said Letters Patent are hereby corrected as shown below:

Insert on page 1 after [76]:

[73] Assignee: Elastogran Maschinenbau GmbH
Strasslach, Federal Republic of Germany Signed and Sealed this Tenth Day of September 1985

[SEAL]

*Attest:*

DONALD J. QUIGG

*Attesting Officer*   Acting Commissioner of Patents and Trademarks - Designate